(12) United States Patent
Chang et al.

(10) Patent No.: US 12,181,949 B2
(45) Date of Patent: Dec. 31, 2024

(54) POWER MANAGEMENT DEVICE AND MANAGEMENT METHOD THEREOF

(71) Applicants: Tsang-Ming Chang, Taipei (TW); Yi-Hsun Lin, Taipei (TW); Ching-Ji Liang, Taipei (TW); Hsun-Hung Wang, Taipei (TW); Hao-Jung Chiou, Taipei (TW)

(72) Inventors: Tsang-Ming Chang, Taipei (TW); Yi-Hsun Lin, Taipei (TW); Ching-Ji Liang, Taipei (TW); Hsun-Hung Wang, Taipei (TW); Hao-Jung Chiou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/575,647

(22) Filed: Jan. 14, 2022

(65) Prior Publication Data

US 2022/0350393 A1 Nov. 3, 2022

Related U.S. Application Data

(60) Provisional application No. 63/181,170, filed on Apr. 28, 2021.

(51) Int. Cl.
*G06F 1/32* (2019.01)
*G06F 1/3212* (2019.01)
(Continued)

(52) U.S. Cl.
CPC .......... *G06F 1/3287* (2013.01); *G06F 1/3212* (2013.01); *G06F 1/3225* (2013.01)

(58) Field of Classification Search
CPC .... G06F 1/3287; G06F 1/3212; G06F 1/3225; G06F 1/26; G06F 1/263; G06F 1/266
See application file for complete search history.

(56) References Cited

U.S. PATENT DOCUMENTS

| | | | |
|---|---|---|---|
| 8,533,528 B2 * | 9/2013 | Maciorowski ............ | G06F 1/30 714/24 |
| 10,948,934 B1 * | 3/2021 | Young ....................... | G06F 1/26 |

(Continued)

FOREIGN PATENT DOCUMENTS

| | | | |
|---|---|---|---|
| CN | 106776365 A * | 5/2017 | ............... G06F 1/26 |
| CN | 111220926 | 6/2020 | |

(Continued)

OTHER PUBLICATIONS

"Office Action of Taiwan Counterpart Application", issued on Aug. 26, 2022, p. 1-p. 7, No translation provided.

*Primary Examiner* — Jaweed A Abbaszadeh
*Assistant Examiner* — Cheri L Harrington
(74) *Attorney, Agent, or Firm* — JCIPRNET

(57) ABSTRACT

A power management device and a management method thereof are provided. The power management device includes a switch, a detection circuit and a controller. The switch receives an external power. The detection circuit receives an internal power and at least one operation power. The detection circuit determines whether at least one of the internal power and the operation power is in a preset specification range or not to generate a protection activate signal. The controller sets a protection flag according to the protection activate signal, and generates a control signal according to the protection flag by executing an application program. The controller transmits the control signal to turn off the switch.

16 Claims, 4 Drawing Sheets

(51) Int. Cl.
 *G06F 1/3225* (2019.01)
 *G06F 1/3287* (2019.01)

(56) References Cited

U.S. PATENT DOCUMENTS

| | | | |
|---|---|---|---|
| 11,404,906 B1* | 8/2022 | Wang | H02M 1/008 |
| 11,664,675 B2* | 5/2023 | Inai | G06F 1/263 |
| | | | 307/142 |
| 2008/0238655 A1* | 10/2008 | McShane | G06F 1/32 |
| | | | 340/538 |
| 2010/0077238 A1* | 3/2010 | Vogman | G06F 1/3296 |
| | | | 713/340 |
| 2013/0089066 A1* | 4/2013 | Murakami | H04B 1/7143 |
| | | | 370/330 |
| 2014/0068310 A1* | 3/2014 | Sultenfuss | G06F 1/3212 |
| | | | 713/340 |
| 2015/0153815 A1* | 6/2015 | Ito | G06F 1/30 |
| | | | 713/323 |
| 2015/0355696 A1* | 12/2015 | Pamley | G06F 1/3203 |
| | | | 713/300 |
| 2017/0179741 A1* | 6/2017 | Tian | H02J 7/00309 |
| 2017/0249449 A1* | 8/2017 | Lu | G06F 21/31 |
| 2018/0024605 A1* | 1/2018 | Haensgen | H02J 13/00001 |
| | | | 713/310 |
| 2018/0172770 A1* | 6/2018 | Sun | B60L 58/10 |
| 2018/0225249 A1* | 8/2018 | Lambourne | G06F 13/4022 |
| 2019/0036367 A1* | 1/2019 | Sultenfuss | H02J 50/80 |
| 2020/0133379 A1* | 4/2020 | Muccini | G06F 1/263 |
| 2020/0142465 A1* | 5/2020 | Jenne | G06F 1/28 |
| 2020/0192453 A1* | 6/2020 | Rathbun | G06F 1/305 |
| 2020/0366183 A1* | 11/2020 | Lam | G06F 1/263 |
| 2022/0103006 A1* | 3/2022 | Inai | H02J 9/06 |
| 2023/0074929 A1* | 3/2023 | Sole | H02J 1/084 |

FOREIGN PATENT DOCUMENTS

| | | |
|---|---|---|
| CN | 112152310 | 12/2020 |
| TW | 478232 | 3/2002 |
| TW | 201310838 | 3/2013 |

* cited by examiner

POWER MANAGEMENT DEVICE AND MANAGEMENT METHOD THEREOF

CROSS-REFERENCE TO RELATED APPLICATION

This application claims the priority benefit of U.S. provisional application serial no. 63/181,170, filed on Apr. 28, 2021. The entirety of the above-mentioned patent application is hereby incorporated by reference herein and made a part of this specification.

BACKGROUND

Technical Field

The disclosure relates to a power management device and a management method thereof, and more particularly to a power management device and a management method that perform a power protection action through an application program.

Description of Related Art

On a power circuit end of an electronic device, if a circuit element is damaged, such as a short circuit of a transistor which serves as a switch, a high voltage may be directly short-circuited to an unexpected circuit element, and the circuit element may be burned.

In a conventional electronic device, the electronic device can provide an over-voltage and over-current protection mechanism. However, with this basic protection mechanism, when the electronic device is triggered to a protection set point, a protection circuit may fail to activate the protection mechanism in time and cause damage to an element. In addition, after the protection mechanism is triggered, a power supply may be reactivated and the protection mechanism may be triggered again when a malfunction has not been actually rectified for a power abnormality. Such repeated triggering of the protection mechanism may also cause damage to a circuit element of the electronic device.

SUMMARY

The disclosure provides a power management device and a management method, which can ensure that an electronic device is not damaged due to a power abnormality.

The power management device of the disclosure includes a switch, a detection circuit, and a controller. The switch receives an external power. The detection circuit receives an internal power generated according to the external power and at least one operation power generated according to the internal power. The detection circuit determines whether at least one of the internal power and the operation power is in a preset specification range or not to generate a protection activate signal. The controller is coupled to the detection circuit, sets a protection flag according to the protection activate signal, and executes an application program to generate a control signal according to the protection flag. The controller transmits the control signal to turn off the switch.

The power management method of the disclosure includes: receiving, by a switch, an external power; determining, by a detection circuit, whether at least one of an internal power and at least one operation power is in a preset specification range to generate a protection activate signal, wherein the internal power is generated according to the external power, and the at least one operation power is generated according to the internal power; setting, by a controller, a protection flag according to the protection activate signal, and executing an application program to generate a control signal according to the protection flag; and transmitting the control signal to turn off the switch.

Based on the above, the power management device of the disclosure detects whether an abnormal phenomenon occurs in at least one of the internal power and the operation power, and according to a detection result, turns off the receipt of the external power by executing the application program. In an embodiment of the disclosure, the power management device can latch a power abnormal state that has occurred by storing an activated protection flag, and reactivate the receipt of the external power after a power abnormal phenomenon is effectively rectified. In this way, work safety of the electronic device can be ensured.

DESCRIPTION OF THE EMBODIMENTS

Figure 1:
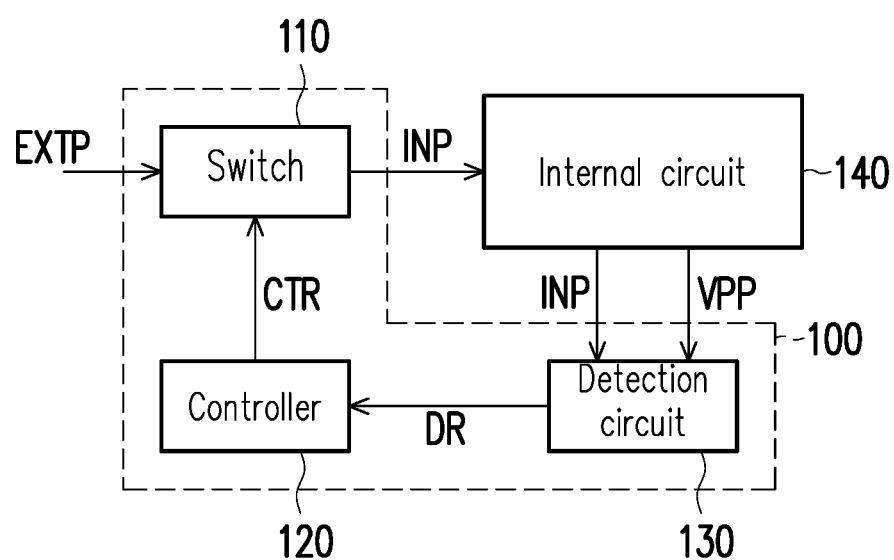
FIG. 1 is a schematic diagram of a power management device according to an embodiment of the disclosure.

Please refer to FIG. 1. FIG. 1 is a schematic diagram of a power management device according to an embodiment of the disclosure. The power management device 100 includes a switch 110, a controller 120 and a detection circuit 130. The switch 110 receives an external power EXTP, and provides an internal power INP to an internal circuit 140 of an electronic device according to the external power EXTP. The detection circuit 130 is coupled to the internal circuit 140 for receiving the internal power INP and one or a plurality of operation power VPP. The detection circuit 130 is configured to compare the internal power INP and the operation power VPP with a preset specification range, and generate a protection activate signal DR when at least one of the internal power INP and the operation power VPP exceeds the preset specification range.

The controller 120 is coupled to the switch 110 and the detection circuit 130. The controller 120 receives the protection activate signal DR generated by the detection circuit 130, and sets a protection flag according to the protection activate signal DR. The controller 120 generates a control signal CTR according to the protection flag by executing an application program. The controller 120 transmits the control signal CTR to the switch 110, and turns off the switch 110 through the control signal CTR.

Regarding an overall operation detail of the power management device 100, when the electronic device is in operation, the switch 110 that receives the external power EXTP is turned on and transmits the internal power INP to the internal circuit 140. In the embodiment, the internal circuit 140 may have a battery to receive the internal power INP for charging. The internal circuit 140 can further convert the internal power INP to generate the operation power VPP.

One or a plurality of circuit chips in the internal circuit 140 operate based on the operation power VPP.

The detection circuit 130 receives the internal power INP and the operation power VPP from one or a plurality of circuit chips in the internal circuit 140. The detection circuit 130 presets a preset specification range. The preset specification range has a first threshold and a second threshold, and the first threshold is greater than the second threshold. The detection circuit 130 compares the internal power INP with the second threshold. When the internal power INP is lower than the second threshold, it indicates that a large current pumping phenomenon has occurred in the internal power INP, for example, a short-circuit phenomenon between paths supplying the internal power INP. At this time, the detection circuit 130 can determine an abnormal power state that the internal circuit 140 has an overcurrent, and generates an enabled protection activate signal DR.

Moreover, the detection circuit 130 can further compare the operation power VPP with the first threshold. When the operation power VPP is greater than the first threshold, the detection circuit 130 determines an abnormal power state that the internal circuit 140 has an overvoltage and generates the enabled protection activate signal DR.

The above-mentioned comparison between the operation power VPP and the first threshold and the comparison between the internal power INP and the second threshold can be performed simultaneously. The detection circuit 130 can enable the protection activate signal DR when one of the above-mentioned abnormal power states, the overcurrent and the overvoltage, occurs.

In the embodiment, the protection activate signal DR may be a digital signal. When the protection activate signal DR is enabled, the detection circuit 130 can instruct the protection activate signal DR to be a first logical value. When the protection activate signal DR is disabled, the detection circuit 130 can instruct the protection activate signal DR to be a second logic value.

The first logical value and the second logical value are complementary. For example, the first logical value can be 0 and the second logical value can be 1, or the first logical value can be 1 and the second logical value can be 0. However, the two logical values are not limited thereto.

When the protection activate signal DR is enabled, the controller 120 can set a protection flag according to the enabled protection activate signal DR. Further, the controller 120 can instruct the protection flag to be written into a storage device to perform a latching operation on an abnormal voltage state. In the embodiment, the storage device may be a non-volatile memory, such as read only memory (ROM), flash memory, resistive random access memory (RRAM) or other non-volatile memory devices known to those of ordinary skill in the art.

In addition, the controller 120 can generate a control signal CTR according to a set protection flag recorded by the storage device. The controller 120 transmits the control signal CTR to a control terminal of the switch 110 to turn off the switch 110 and stop receiving the external power EXTP.

Based on the above, when an abnormal power state occurs, the power management device 100 can stop the internal power INP being supplied to the internal circuit 140 by turning off the switch 110, and safety of a circuit element in the internal circuit 140 can be ensured. In addition, the abnormal voltage state of the electronic device can be latched in the controller 120. Therefore, the switch 110 cannot be turned on before the malfunction causing the abnormal voltage is rectified, and safety of the internal circuit 140 can be ensured.

Please note that in the embodiment of the disclosure, if the electronic device is to be reactivated, an external command needs to be provided to the controller 120 to instruct the controller 120 to remove the stored protection flag. The above-mentioned external command can be configured to generate a trigger signal. The controller 120 can remove the protection flag when the trigger signal is enabled for longer than a predetermined time period. In the embodiment of the disclosure, the electronic device may have a button. A user can provide the enabled trigger signal to the controller 120 by long pressing the above-mentioned button after a malfunction causing a power abnormality is rectified, so as to reactivate the switch 110.

The internal circuit 140 may have one or a plurality of processors to receive the operation power VPP, such as a central processing unit (CPU) or a graphics processing unit (GPU) or other circuits. In addition, the internal circuit 140 may have a charging circuit to provide an internal power INP to charge the battery of the electronic device.

Further, when the protection flag in the controller 120 is set, the controller 120 can further instruct the battery in the internal circuit 140 to enter a shipping mode to stop the charging and discharging of the battery, and safety of the electronic device is ensured.

Regarding the embodiment of the disclosure, in terms of hardware architecture, the switch 110 may be a transistor switch. The controller 120 may be an embedded controller (EC). The detection circuit 130 may be constructed by a plurality of comparators, and the comparators can be constructed by a comparison circuit known to those of ordinary skill in the art, without specific limitation.

Figure 2:
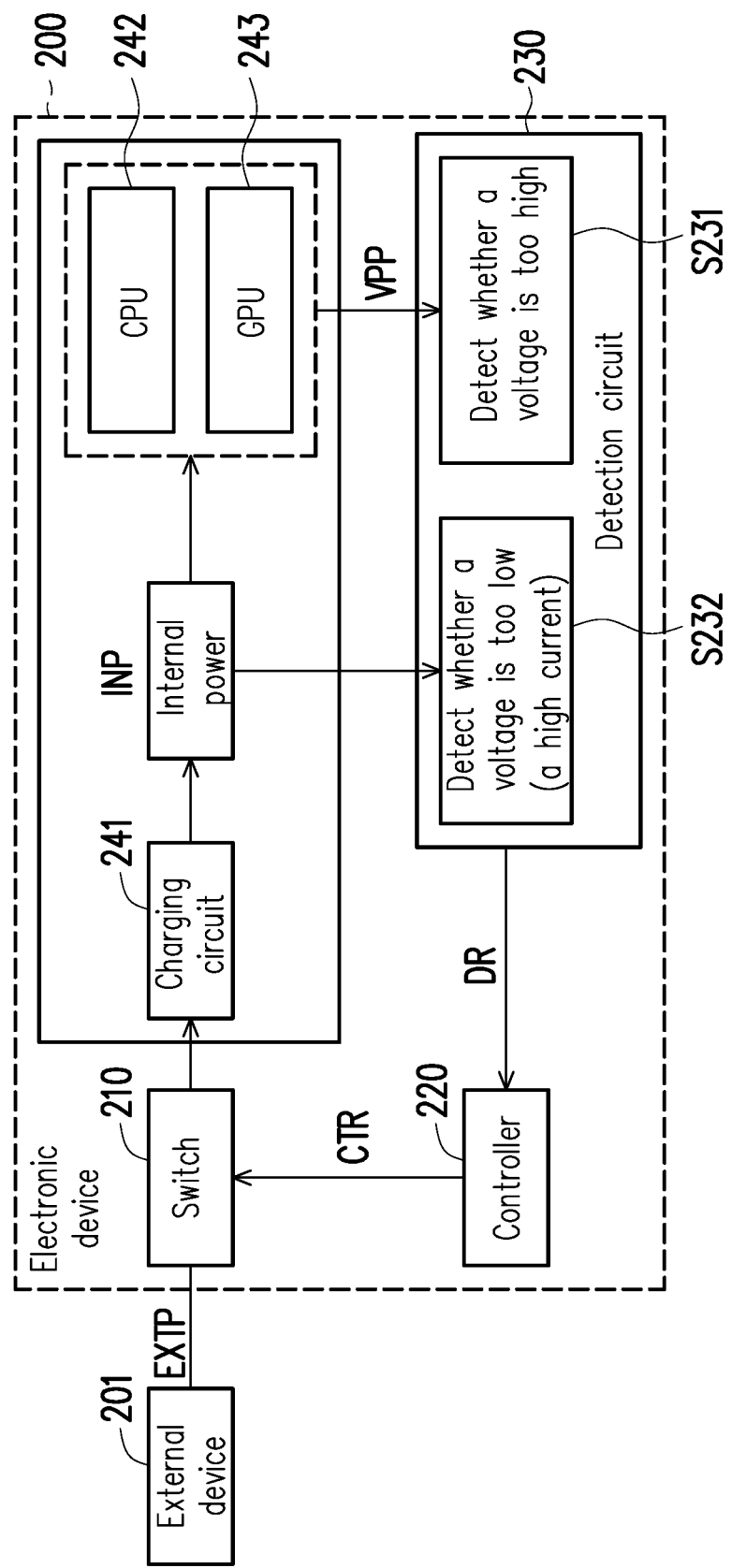
FIG. 2 is a schematic diagram of an embodiment in an electronic device applying the power management device of the disclosure.

Please refer to FIG. 2 for the following. FIG. 2 is a schematic diagram of an embodiment in an electronic device applying the power management device of the disclosure. A switch 210 of the electronic device 200 is coupled to an external device 201 and can receive an external power EXTP by the external device 201. When the electronic device 200 is operating normally, the switch 210 is turned on and the external power EXTP is transmitted to a charging circuit 241. The charging circuit 241 can generate an internal power INP according to the external power EXTP, and provide the internal power INP to charge a battery (not shown) in the electronic device 200. The electronic device 200 can convert the internal power INP to generate an operation power VPP. A central processing unit (CPU) 242 and a graphics processing unit (GPU) 243 in the electronic device 200 can operate based on the operation power VPP.

A detection circuit 230 receives the internal power INP and the operation power VPP. The detection circuit 230 is configured to perform step S231 to detect whether the voltage of the operation power VPP is too high (higher than the first threshold), and to perform step S232 to detect whether the voltage of the internal power INP is too low (lower than the second threshold). In step S232, detecting whether the voltage of the internal power INP is too low is configured to detect whether the electronic device 200 has an overcurrent problem.

The detection circuit 230 can generate a protection activate signal DR according to detection results of steps S231 and S232. When either the voltage of the operation power VPP is too high or the voltage of the internal power INP is too low, the detection circuit 230 can generate an enabled protection activate signal DR.

In addition, a controller 220 is an embedded controller and can be configured to execute an application program. The controller 220 may have a built-in non-volatile memory or an external non-volatile memory to store a protection flag.

When the protection activate signal DR is in an enabled state, the controller 220 can set a protection flag and store the set protection flag in a non-volatile memory to latch an abnormal voltage state of the electronic device 200. In the state when the protection flag is set, the controller 220 can generate a control signal CTR for turning off the switch 210.

After a power failure of the electronic device 200 is rectified, a user can send a trigger signal to the controller 220. To avoid false action, the controller 220 may remove the protection flag after the trigger signal is enabled for a time period. After the protection flag is removed, the controller 220 can generate a control signal CTR to turn on the switch 210 again according to the removed protection flag.

According to the above, when the electronic device 200 has an abnormal power state, the power management device of the disclosure can latch the abnormal power state to ensure that the abnormal power state can only be unlatched after a malfunction is completely rectified. Thus, a situation where the switch 210 is damaged again by being reactivated before the malfunction is rectified is avoided.

Figure 3:
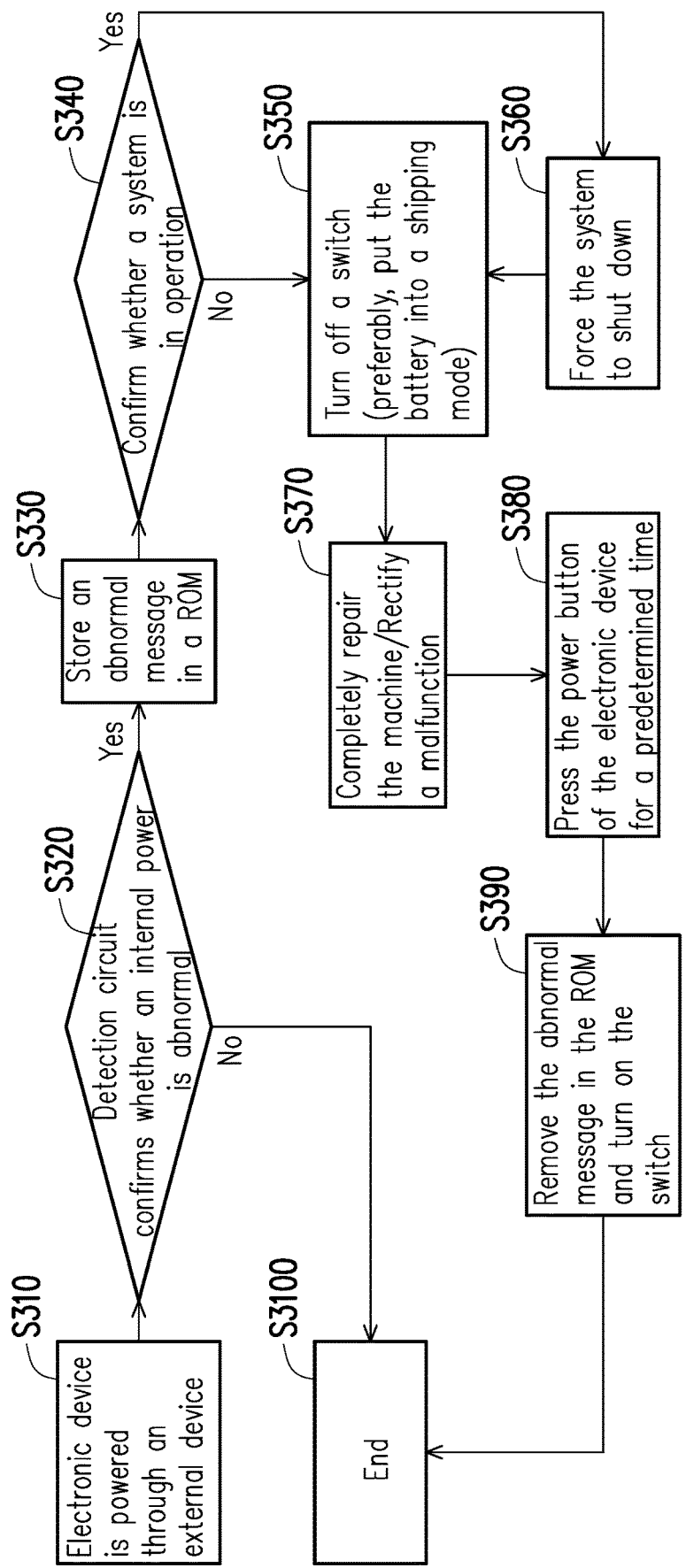
FIG. 3 illustrates an operation flowchart of the power management device according to the embodiment of the disclosure.

Please refer to FIG. 3 for the following. FIG. 3 illustrates an operation flowchart of the power management device according to the embodiment of the disclosure. In step S310, an electronic device receives a supplied external power through an external device. In step S320, a detection circuit can detect whether an internal power is abnormal. If the detection result of step S320 is negative, the process can be ended (step S3100). If the detection result of step S320 is positive, step S330 is to be performed.

In step S330, a controller can store an abnormal state in a read only memory (ROM). In addition, in step S340, the controller can confirm whether a system to which the electronic device belongs is in use. If the system is in use, the controller can forcibly shut down the system and perform step S350. If the system is not in use, step S350 can be directly performed.

In step S350, the controller can turn off a switch. In an exemplary embodiment, the controller can further instruct a battery of the electronic device to enter a shipping mode.

Next, in step S370, an engineer can repair a machine. After completely repairing the machine and rectifying a malfunction, in step S380, the engineer presses the switch of the electronic device for a predetermined time to send a trigger signal to the controller. Thus, the controller can remove an abnormal message in the ROM in step S390 and set the switch to a turn on state, and the process ends (step S3100).

Figure 4:
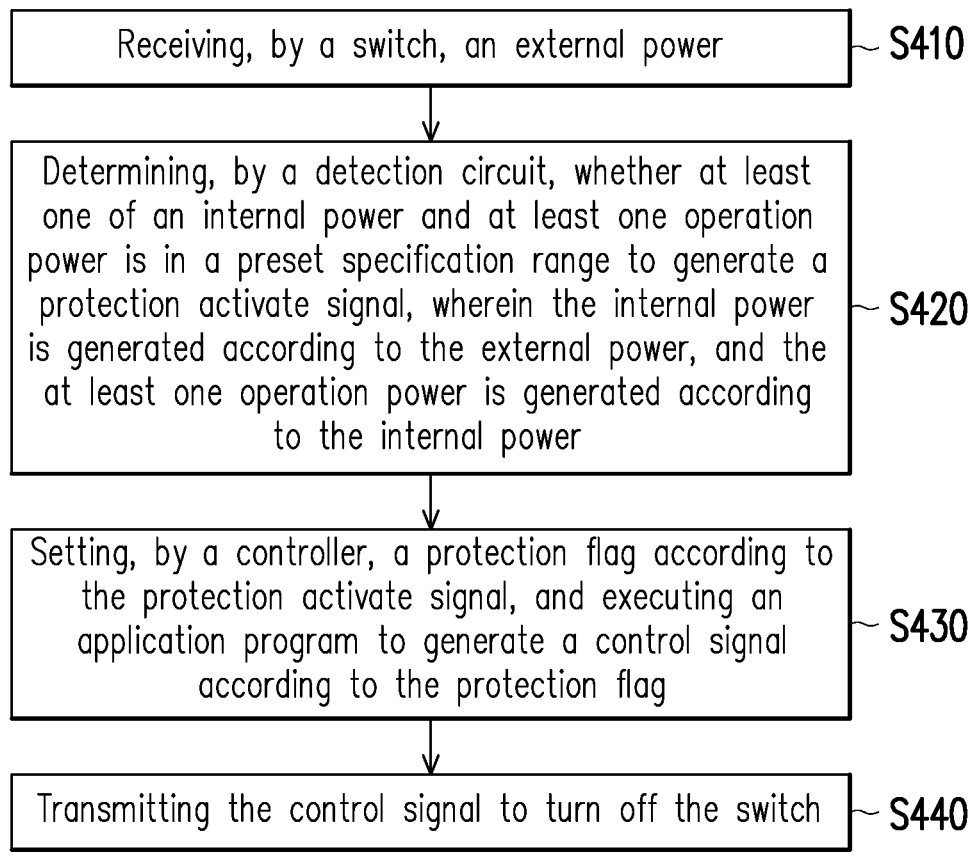
FIG. 4 illustrates a flowchart of a power management method according to an embodiment of the disclosure.

Please refer to FIG. 4. FIG. 4 illustrates a flowchart of a power management method according to an embodiment of the disclosure. In step S410, a switch receives an external power. In step S420, a detection circuit determines whether at least one of an internal power and at least one operation power is in a preset specification range to generate a protection activate signal. The internal power is generated according to the external power, and the at least one operation power is generated according to the internal power. In step S430, a controller sets a protection flag according to the protection activate signal, and executes an application program to generate a control signal according to the protection flag. Next, in step S440, the control signal is transmitted to turn off the switch.

Since embodiment details of the above-mentioned steps have been described in detail in the foregoing embodiments, further descriptions are not repeated in the following.

In summary, the power management device of the disclosure detects an abnormal power state by detecting an internal power of an electronic device and an operation power used by a circuit chip. When the abnormal power state occurs, a protection flag is set and the switch is turned off according to the protection flag. In the embodiment of the disclosure, the controller generates a control signal to turn off the switch by executing an application program.

What is claimed is:

1. A power management device, comprising:
   a switch, configured to receive an external power;
   a battery;
   a charging circuit, configured to provide an internal power to charge the battery;
   a detection circuit, configured to:
      receive the internal power and at least one operation power,
      determine whether at least one of the internal power and the at least one operation power is in a preset specification range, and
      generate a protection activate signal in response to having determined that at least one of the internal power and the at least one operation power is outside the preset specification range, wherein the detection circuit is configured to simultaneously determine whether the internal power and the at least one operation power are within the preset specification range; and
   a controller, coupled to the detection circuit, configured to:
      set a protection flag according to the protection activate signal;
      execute an application program to generate a control signal in response to setting of the protection flag determine whether a system, to which the power management device belongs, is in use;
      in a case where the system is determined to be in use, initiate a shutdown procedure to shut down the system; transmit the control signal to turn off the switch and stop receiving the external power;
      instruct the battery to enter a shipping mode, based on the protection activate flag being set, by stopping the charging and discharging of the battery;
      receive a trigger signal different from the protection activate signal; and
      remove the protection flag when the trigger signal is enabled for longer than a predetermined time period.

2. The power management device according to claim 1, wherein the preset specification range has a first threshold and a second threshold, and the first threshold is greater than the second threshold.

3. The power management device according to claim 2, wherein the detection circuit is configured to enable the protection activate signal when the internal power is lower than the second threshold.

4. The power management device according to claim 2, wherein the detection circuit is configured to enable the protection activate signal when the at least one operation power is greater than the first threshold.

5. The power management device according to claim 1, wherein the controller is configured to store the protection flag in a storage device.

6. The power management device according to claim 5, wherein the storage device is a non-volatile memory.

7. The power management device according to claim 1, wherein the detection circuit is coupled to the battery to receive the internal power, and the detection circuit is configured to receive the at least one operation power from at least one circuit chip.

8. The power management device according to claim 1, wherein the controller is configured to generate the control signal to turn on the switch according to the protection flag that has been removed.

9. The power management device according to claim 1, wherein the switch further configured to provide the external power with the charging circuit, and the charging circuit is configured to generate the internal power according to the external power.

10. A power management method, adapted for execution by a power management device, the method comprising:
- receiving, by a switch of the power management device, an external power;
- providing, by a charging circuit of the power management device, an internal power to charge a battery of the power management device;
- receiving, by a detection circuit of the power management device, an internal power and at least one operation power;
- determining, by the detection circuit, whether at least one of an internal power and at least one operation power is in a preset specification range;
- generating, by the detection circuit, a protection activate signal in response to having determined that at least one of the internal power and the at least one operation power is outside the preset specification range, wherein the detection circuit is configured to simultaneously determine whether the internal power and the at least one operation power are within the preset specification range;
- setting, by a controller of the power management device, a protection flag according to the protection activate signal;
- executing, by the controller, an application program to generate a control signal in response to setting of the protection flag;
- determining, by the controller, whether a system, to which the power management device belongs, is in use;
- in a case where the system is determined to be in use, initiating, by the controller, a shutdown procedure to shut down the system;
- transmitting, by the controller, the control signal to turn off the switch and stop receiving the external power;
- instructing, by the controller, the battery to enter a shipping mode, based on the protection activate flag being set, by stopping the charging and discharging of the battery;
- receiving, by the controller, a trigger signal different from the protection activate signal; and
- removing, by the controller, the protection flag when the trigger signal is enabled for longer than a predetermined time period.

11. The power management method according to claim 10, wherein the preset specification range has a first threshold and a second threshold, and the first threshold is greater than the second threshold.

12. The power management method according to claim 11, wherein generating, by the detection circuit, the protection activate signal in response to having determined that at least one of the internal power and the at least one operation power is outside the preset specification range comprises:
- enabling, by the detection circuit, the protection activate signal when the internal power is lower than the second threshold.

13. The power management method according to claim 11, wherein generating, by the detection circuit, the protection activate signal in response to having determined that at least one of the internal power and the at least one operation power is outside the preset specification range comprises:
- enabling, by the detection circuit, the protection activate signal when the at least one operation power is higher than the first threshold.

14. The power management method according to claim 10, further comprising:
- storing the protection flag in a storage device.

15. The power management method according to claim 14, wherein the storage device is a non-volatile memory.

16. The power management method according to claim 10, further comprising:
- generating, by the controller, the control signal according to the protection flag that has been removed, and turning on the switch according to the control signal.

* * * * *